United States Patent [19]
Leichliter et al.

[11] Patent Number: 5,967,276
[45] Date of Patent: Oct. 19, 1999

[54] VISCOUS ACTUATED BALL RAMP CLUTCH AND IMPROVED HOUSING THEREFOR

[75] Inventors: Wayne K. Leichliter, Marshall; Erlen B. Walton, Farmington Hills, both of Mich.

[73] Assignee: Eaton Corporation, Cleveland, Ohio

[21] Appl. No.: 09/149,991

[22] Filed: Sep. 9, 1998

Related U.S. Application Data

[63] Continuation-in-part of application No. 08/865,901, May 30, 1997, abandoned.

[51] Int. Cl.$^6$ ............... F16D 35/00; B60K 17/35
[52] U.S. Cl. ................... 192/35; 192/57; 74/650
[58] Field of Search ................. 192/58.41, 57, 192/35, 70.2, 58.42; 74/650

[56] References Cited

U.S. PATENT DOCUMENTS

| | | | |
|---|---|---|---|
| 2,588,495 | 3/1952 | Dodge | 192/12 R |
| 2,947,393 | 8/1960 | Grover | 192/35 X |
| 4,562,897 | 1/1986 | Renneker | 180/233 |
| 4,700,823 | 10/1987 | Winckler | 192/107 M |
| 5,012,908 | 5/1991 | Kobayashi et al. | 192/35 |
| 5,036,963 | 8/1991 | Murata | 192/57 X |
| 5,070,975 | 12/1991 | Tanaka et al. | 192/35 |
| 5,083,986 | 1/1992 | Teraoka et al. | 192/58.42 X |
| 5,398,792 | 3/1995 | Teraoka | 192/35 X |
| 5,890,573 | 4/1999 | Kwoka | 192/35 |

FOREIGN PATENT DOCUMENTS

| | | |
|---|---|---|
| 0 314 420 | 3/1989 | European Pat. Off. . |

*Primary Examiner*—Rodney H. Bonck
*Attorney, Agent, or Firm*—L. J. Kasper

[57] ABSTRACT

A differential device (17) for use in a four wheel drive system, the device including a viscous coupling (29), a ball ramp actuator (31), and a clutch pack (33). Under normal driving conditions, most of the torque is transmitted to the front drive wheels (11), and the device (17) rotates as a unit. If the front wheels (11) begin to slip, the input shaft (15) and input coupling member (35) rotate faster than the output coupling member (43), thus transmitting torque to the output coupling member (43). This torque is transmitted to the first ramp plate (51) of the ball ramp actuator (31), displacing the actuator from its neutral position (FIG. 3), such that the second ramp plate (52) begins to load the clutch pack (33) and transmit torque from the housing (25) to the output shaft (19), and from there to the rear drive wheels (23). The device (17) includes a housing (25) which preferably comprises a unitary member having a plurality of axially-extending grooves (77) which receive mating ridges (79) on the outer surface of the input coupling member (35), and ears (81) on the outer friction discs (65). Rollovers (76,83) at opposite ends of the housing retain the various components, thus providing a simple and inexpensive housing and method of assembly of the device.

5 Claims, 3 Drawing Sheets

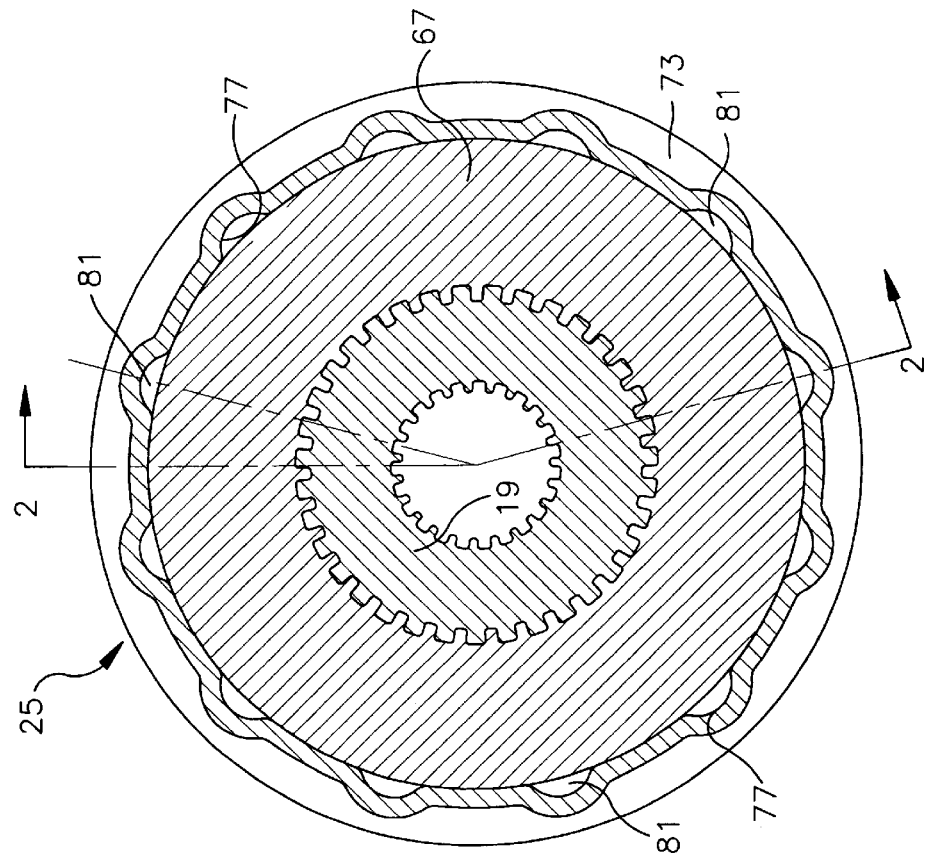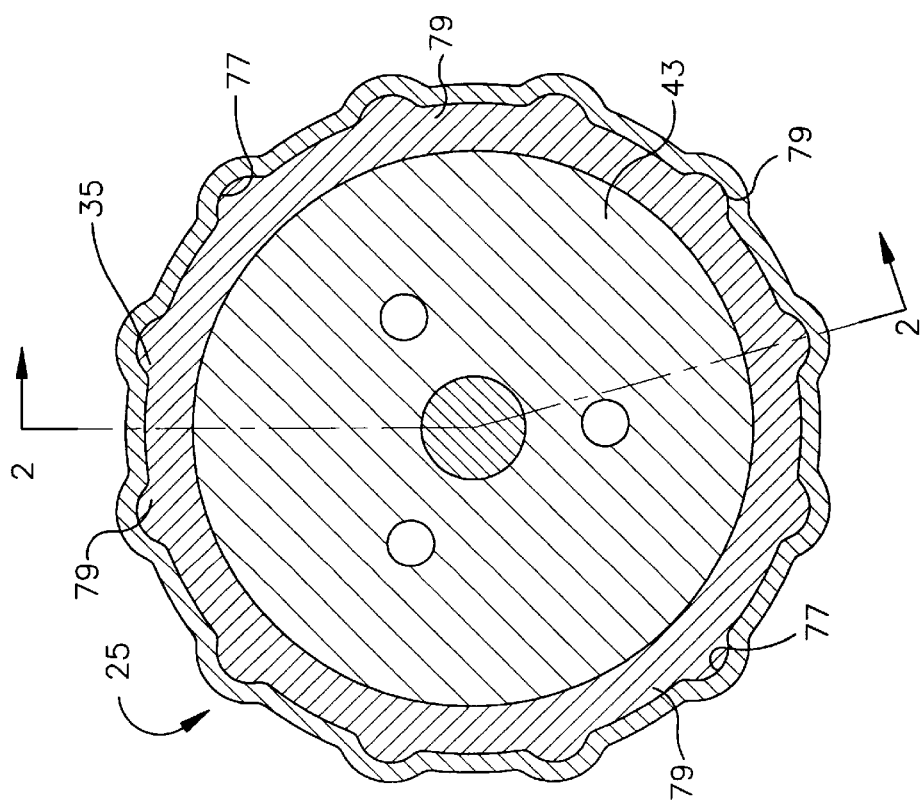

VISCOUS ACTUATED BALL RAMP CLUTCH AND IMPROVED HOUSING THEREFOR

CROSS-REFERENCE TO RELATED APPLICATION

This application is a continuation-in-part (CIP) of co-pending application U.S. Ser. No. 865,901, filed May 30, 1997, and now abandoned, in the name of Erlen B. Walton for a "VISCOUS ACTUATED BALL RAMP CLUTCH".

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE DISCLOSURE

The present invention relates to a driveline system for a four wheel drive vehicle, and more particularly, to a differential device for use in such a driveline system. The use of the term "differential" does not imply the presence of conventional differential gearing, but instead, the term is used primarily because the device of the present invention replaces the typical prior art center differential. However, it should be understood that the device illustrated, described and claimed herein has uses other than as a center differential.

In many of the vehicles being produced today, the basic vehicle platform is a front wheel drive. However, in many such vehicles, especially in vans and sport utility vehicles, it is considered desirable to be able to provide four wheel drive, at least under certain operating conditions.

Typically, the various arrangements for achieving part-time four wheel drive have been complex and expensive, and in some cases, have required some sort of control scheme to achieve the four wheel drive (or rear wheel drive) in response to certain predetermined operating conditions.

In certain vehicle applications, it is acceptable to provide only front wheel drive under most operating conditions, and rear wheel drive is required only when the front drive wheels are slipping (e.g., under poor traction conditions). However, the prior art has not provided a suitable device wherein only front wheel drive is provided, with no substantial torque being transmitted to the rear wheels, until the front wheels begin to slip. For example, U.S. Pat. No. 4,562,897 discloses a viscous clutch in the driveline, between the front transaxle and the rear wheels, but requires a selector arrangement in order to choose among transmitting torque through the viscous coupling, or disconnecting the viscous coupling, or bypassing the viscous coupling. Implementation of such a selector arrangement adds substantially to the overall complexity and cost of the driveline system, and as is well known to those skilled in the art, component cost is a major factor in determining whether or not a particular system or component will be utilized on a vehicle.

It is known from U.S. Pat. No. 5,070,975 and from European Application EP 0 314 420 to use, as a center differential in a four wheel driveline, a viscous actuated ball ramp type friction clutch to transmit torque to the rear axles when there is a speed difference between the front and rear wheels. It is believed that the torque transmitting capability of the device of the cited patent and application would be somewhat limited by the fact that one of the ball ramp plates comprises the input to the viscous coupling, but despite the limited torque capability, the device of the cited patent would probably be substantially more expensive than would be acceptable for typical vehicle applications. One of the reasons for the excessive cost of the device of the cited patent is the use of a fairly conventional type of cast housing, having several different machined internal diameters, internal snap ring and O-ring grooves, and a set of internal splines.

BRIEF SUMMARY OF THE INVENTION

Accordingly, it is an object of the present invention to provide an improved differential device for use in a driveline of a vehicle, in which the device utilizes an improved housing, whereby final assembly involves a rollover of the housing for more economical assembly.

It is another object of the present invention to provide such an improved differential device which accomplishes the above-stated object and which includes a viscous coupling and a friction disc device, wherein the improved housing retains the viscous coupling and friction disc device against a reaction torque.

The above and other objects of the invention are accomplished by the provision of an improved differential device of the type including an input shaft adapted to receive input torque from a source of torque. The device also includes an output shaft adapted to provide driving torque to an output device, and a clutch pack including at least a first friction disc fixed to rotate with the input shaft and at least a second friction disc fixed to rotate with the output shaft. The device includes means operable to move the friction discs between a disengaged position and an engaged position comprising a cam ramp actuator including first and second ramp plates, and a plurality of cam members, each operably disposed between the first and second ramp plates, and in engagement with first and second ramp surfaces, respectively. The second ramp plate is disposed axially adjacent the friction discs and is operable to move the friction discs toward the engaged position, the means operable to move the friction discs further comprising a viscous coupling including an input coupling member fixed to rotate with the input shaft, and an output coupling member.

The improved differential device is characterized by a housing member defining, on its inside surface, at least one axially extending groove, extending at least a major portion of the axial extent of the housing. The first friction disc includes a retention portion extending radially therefrom and being disposed within the axially extending groove. The input coupling member of the viscous coupling includes a retention portion extending radially therefrom and being disposed within the axially extending groove. The housing member defines a shoulder surface extending radially outward adjacent the friction discs and the housing member further includes an endcap portion disposed axially adjacent the friction discs and in engagement with the shoulder surface. The housing member and the endcap portion include means providing relative axial retention therebetween. The housing member and the input coupling member include means providing relative axial retention therebetween.

In accordance with a more limited aspect of the invention, the improved differential device is characterized by the housing member comprising a unitary, stamped member having generally constant wall thickness.

BRIEF DESCRIPTION OF THE DRAWINGS

FIG. 4 is a transverse cross-section, taken on line 4—4 of FIG. 2, but on a somewhat smaller scale.

FIG. 5 is a transverse cross-section, taken on line 5—5 of FIG. 2, and on the same scale as FIG. 4.

DETAILED DESCRIPTION OF THE PREFERRED EMBODIMENT

Figure 1:
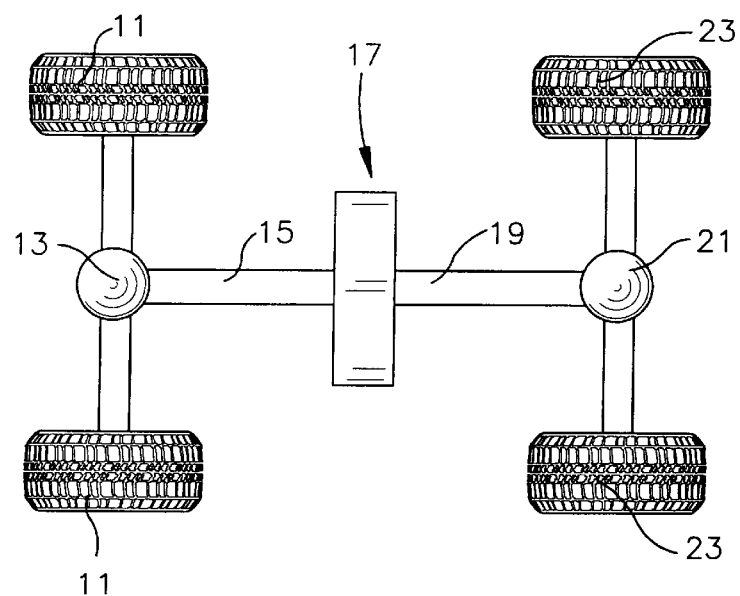
FIG. 1 is a schematic of a driveline system of the type in which the present invention may be utilized.

Referring now to the drawings, which are not intended to limit the invention, FIG. 1 is a schematic of a driveline system for a four wheel drive vehicle, of the type with which the present invention may be utilized. The driveline system of FIG. 1 includes a pair of front drive wheels 11, driven by a front transaxle 13. Extending rearwardly out of the transaxle 13 is an input shaft 15, which typically receives input torque, by means of a right angle gear set (not shown in FIG. 1) in the transaxle 13, such that the speed of rotation of the input shaft 15 is representative of the speed of rotation of the front drive wheels 11.

The input shaft 15 is associated with a center differential device, generally designated 17, which includes an output shaft 19, by means of which torque may be transmitted to a rear differential 21, and then to a pair of rear drive wheels 23. Typically, the device 17 could be reversed, i.e., the shaft 19 could be the input and the shaft 15 could be the output, and therefore, the use herein of the terms "input" and "output" will be understood as explanatory and not limiting. As was mentioned previously, it will be understood by those skilled in the art that the term "center differential device" does not mean or imply that the device include a conventional differential gear set, but instead, the term will be understood in its broader sense to mean that the device 17 will permit differentiating, action between the input shaft 15 and the output shaft 19. In the subject embodiment, the front drive wheels 11 are the primary drive wheels, and the rear drive wheels 23 are only secondary drive wheels. However, within the scope of the present invention, such could be reversed, i.e., the rear wheels being the primary drive wheels and the front wheels being the secondary drive wheels.

Although the present invention will be described as though the front wheels 11 and the rear wheels 23 normally rotate at the same speed, as the vehicle is travelling straight ahead, those skilled in the art will understand that such is typically not the case. For various reasons, such as the fact that the front wheels normally have a smaller rolling radius, the front drive wheels 11 typically rotate somewhat faster than the rear wheels 23. Therefore, in a typical drive system of the type shown in FIG. 1, there is almost always at least some torque being transmitted by the center differential device 17. As a result, the performance requirements for the device 17 are much more stringent than would be the case if the device merely rotated as a "solid" unit for most of its duty cycle.

Figure 2:
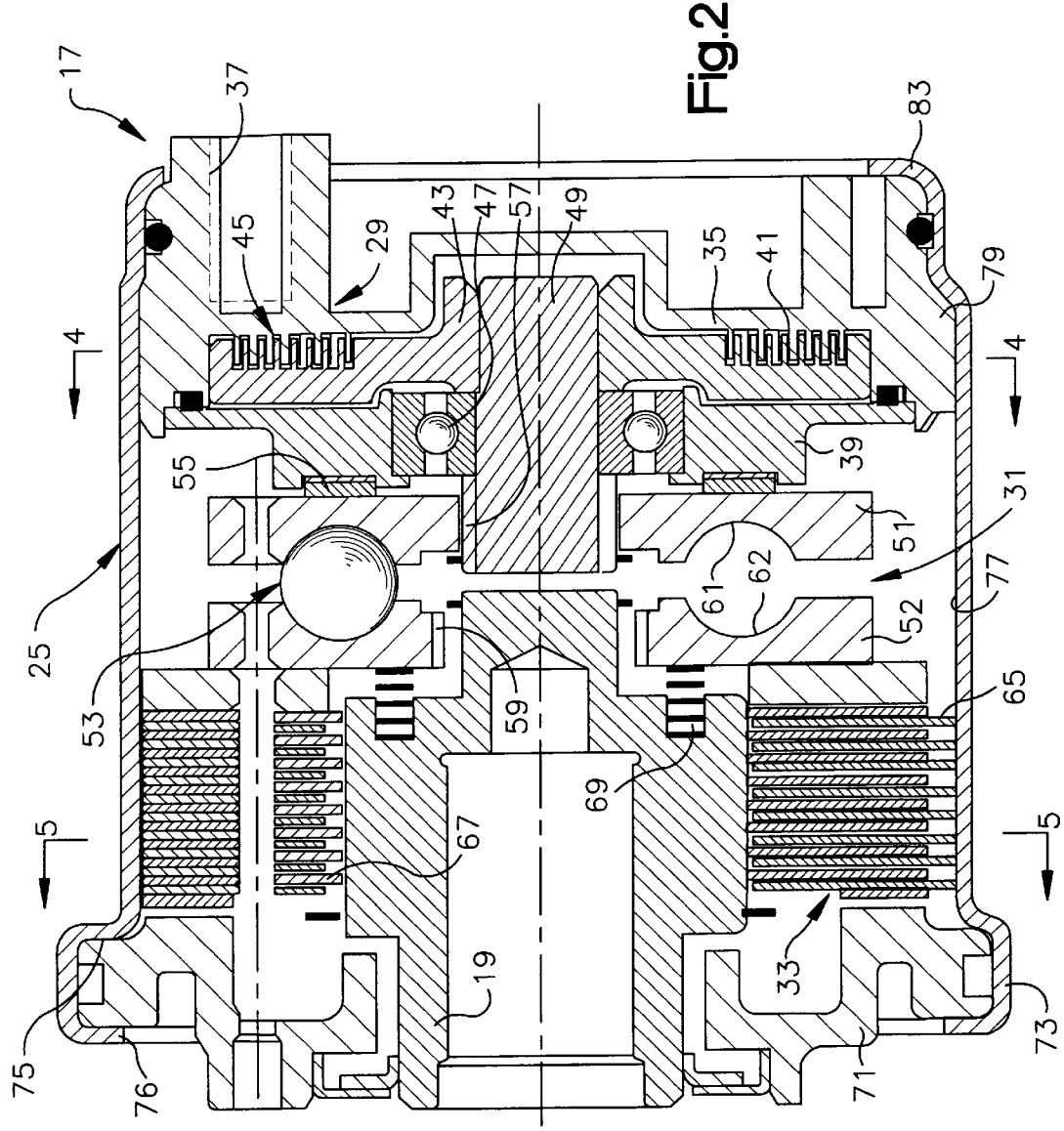
FIG. 2 is an axial cross-section of the differential device of the present invention.

Referring now primarily to FIG. 2, the center differential device 17 will be described in some detail. The device 17 includes a housing 25, and disposed within the housing 25, the center differential device 17 may be viewed as comprising three separate portions as follows: a viscous coupling 29; a ball ramp actuator 31; and a clutch pack 33. It is one important feature of the present invention that these portions comprise separate, somewhat functionally independent devices, as will become apparent from the subsequent description.

The viscous coupling 29 includes an input coupling member 35, which is fixed to the housing 25, in a manner to be described subsequently. The input coupling member 35 preferably defines a plurality of threaded bores 37, by means of which the input shaft 15 can be bolted to the input of the differential device 17. The viscous coupling 29 also includes a housing (body) 39, such that the member 35 and the housing 39 cooperate to comprise a totally functional, self-contained viscous coupling, which defines a viscous shear chamber 41. Preferably, the member 35 and housing 39 are assembled by means of a rollover of a portion of the member 35 about the outer periphery of the housing 39, in a manner well known to those skilled in the art. In accordance with another aspect of the invention, it is very possible, but not certain, that no rotating seals (other than those which may be required in bearing sets) are required to separate the viscous fluid in the chamber 41 from the oil in the rest of the device 17, and because the viscous chamber 41 is permanently sealed, the torque versus slip speed of the coupling 29 will be constant and predictable. Disposed within the chamber 41 is an output coupling member 43, and in a manner well known to those skilled in the art of viscous couplings, the input coupling member 35 and the output coupling member 43 define a plurality of interdigitated lands and grooves, generally designated 45. With viscous fluid (typically, a silicone fluid) disposed in the lands and grooves 45, any relative rotation between the member 35 and the member 43 will result in a shear torque being transmitted to the member 43, the difference in speed between the members 35 and 43 typically being referred to as the "slip speed".

Disposed at the radially inner periphery of the housing 39 is a bearing set shown at 47, having its inner race disposed on a shaft portion 49, which is shown in FIG. 2 as having the output coupling member 43 pressed onto the shaft portion 49. The shaft portion 49 extends axially out of the viscous coupling 29 and into the ball ramp actuator 31. The rest of the function of the shaft portion 49 will be described subsequently.

The ball ramp actuator 31 includes a first ramp plate 51, a second ramp plate 52, and a plurality of balls 53, although it should be understood that any form of cam member may be used. Disposed axially between the first ramp plate 51 and the housing 39 is a thrust bearing set 55, and although a device such as a bronze bushing could be used if handling the axial loading were the only concern, it is significant that the bearing 55 comprise a true "rolling" bearing, such as a needle type bearing. The reasons for this, and the benefits thereof will be described in greater detail subsequently.

The shaft portion 49 is preferably in splined engagement with the first ramp plate 51, by means of a set of splines 57. Therefore, the output coupling member 43 of the viscous coupling 29 rotates at the same speed as the first ramp plate 51, by means of the shaft portion 49. The second ramp plate 52 is in splined engagement with the output shaft 19, by means of a set of splines 59, such that the second ramp plate 52 and the output shaft 19 rotate at the same speed. Alternatively, the shaft 49 and possibly also the forward end of the output shaft 19 could define a shape such as a hexagon, with the adjacent internal surfaces of the coupling member 43, and the ramp plates 51 and 52 defining mating shapes.

In a manner well known to those skilled in the art, the first ramp plate 51 defines a plurality of first ramp surfaces 61, while the second ramp plate 52 defines a plurality of second ramp surfaces 62. In FIG. 2, the ball ramp actuator 31 is shown in its "neutral" position, i.e, each of the balls 53 is disposed in the "valley" of each of the ramp surfaces 61 and 62, such that the ramp plates 51 and 52 are at their minimum axial distance from each other, or stated another way, the overall axial dimension of the plates 51 and 52 is at a minimum. As is also well known to those skilled in the art, the neutral position of the ball ramp actuator 31 would correspond, typically, to a disengaged condition of the clutch pack 33. Preferably, the first and second ramp surfaces 61 and 62 include first and second detents (not illustrated herein), such that a very definite, predetermined speed difference (slip speed) within the viscous coupling 29 is required to initiate ramping of the actuator 31, and such ramping will not occur in response merely to the very slight differences which may occur in response to variations in factors such as tire size, etc.

Disposed immediately adjacent the second ramp plate 52 is the clutch pack 33, including a plurality of outer friction discs 65, and a plurality of inner friction discs 67. The outer discs 65 are in engagement with the housing 25, by means which will be described subsequently. The inner friction discs 67 are in splined engagement with a set of splines (not shown herein) defined on the outer cylindrical surface of the output shaft 19. Although flat friction discs are illustrated and described herein, it should be understood that the invention is not so limited, and various other friction devices could be used, such as cone-shaped members. Therefore, as used hereinafter, and in the appended claims, the term "disc" will be understood to mean and include all such suitable friction devices.

Although not an essential feature of the present invention, each of the friction discs 65 and 67 is provided with a suitable friction material, preferably a pyrolytic carbon friction material, made in accordance with the teachings of U.S. Pat. No. 4,700,823, assigned to the assignee of the present invention and incorporated herein by reference, or perhaps, another material suitable for the particular application and environment. It should be understood by those skilled in the art that, when the ball ramp actuator 31 is in its neutral position, and the clutch pack 33 is "disengaged", the friction discs 65 and 67 may be literally disengaged, in the sense of not even touching each other, but more likely, will be touching each other, and able to transmit some torque, but substantially less than the maximum torque which can be transmitted through the clutch pack 33.

Disposed in openings or recesses in the front (right end in FIG. 2) of the output shaft 19 is a plurality of spring assemblies 69, which, in the subject embodiment, comprise a pack of wave or leaf type springs. The forward ends of the spring assemblies 69 engage the second ramp plate 52, and the function of the spring assemblies 69 is to bias the second ramp plate 52 forwardly, tending to return the ball ramp actuator 31 toward its neutral position.

Figure 3:
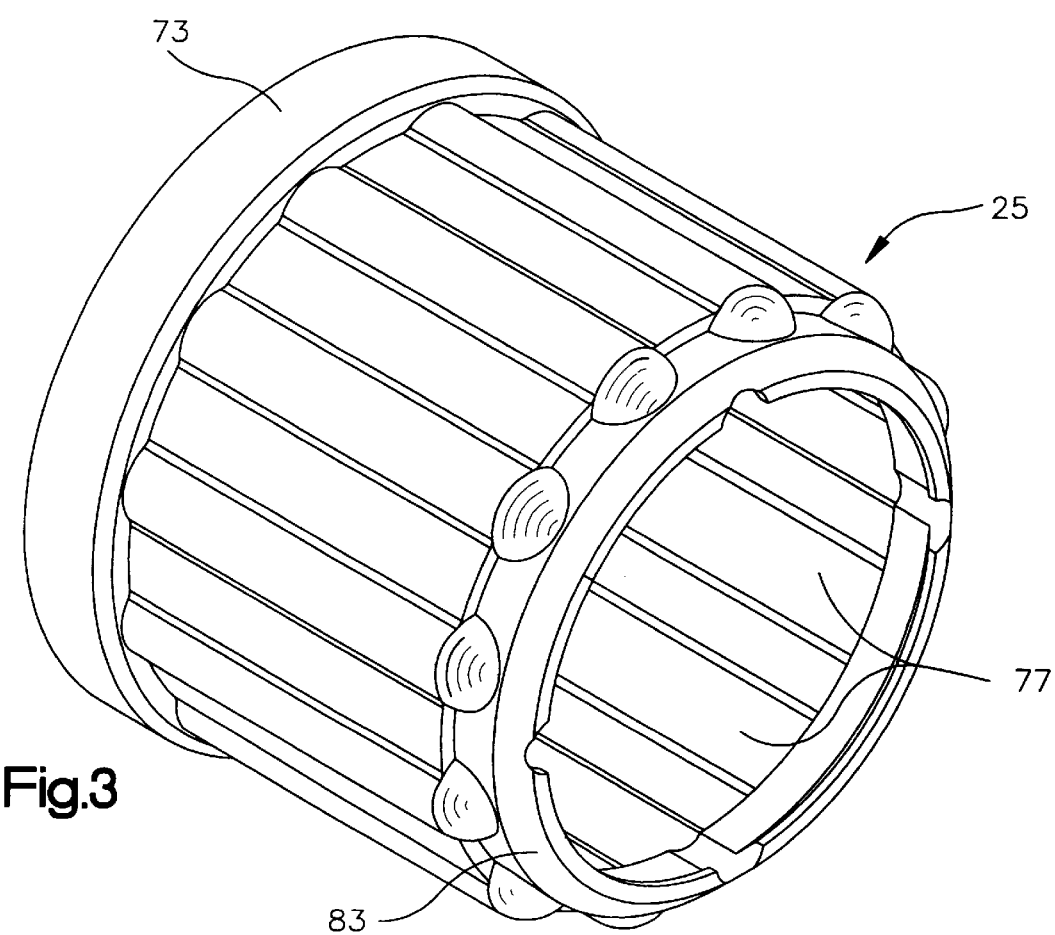
FIG. 3 is a perspective view of the housing of the differential device, the housing comprising an important aspect of the present invention.

Referring now to FIGS. 3, 4, and 5, in conjunction with FIG. 2, the primary aspects of the present invention will be described. Disposed axially adjacent the friction discs 65 and 67 is an endcap member 71 which, as may best be seen in FIG. 2, has an outer diameter which is larger than that of the housing 25, over most of its axial length. However, the housing 25 is formed to have an enlarged portion 73, and defines an inside shoulder surface 75, against which the adjacent surface of the endcap member 71 is seated, such that the shoulder surface 75 serves as a stop surface. Alternatively, the stamping could be provided with a plurality (such as three) of bosses which would together serve as a stop surface. The enlarged portion 73 of the housing 25 includes a rollover 76, which will be discussed further subsequently.

As may best be seen in FIGS. 3, 4, and 5, the housing 25 defines a plurality of axially-extending grooves or slots 77, and in accordance with one important aspect of the present invention, each of the grooves 77 extends axially over a major portion of the axial length of the housing 25. The input coupling member 35, which is preferably a cast aluminum member, defines a plurality of axially extending ridges (or raised portions) 79 which are shaped and spaced to permit the assembled viscous coupling 31 to be inserted into the housing 25, with the ridges 79 to be received within the grooves 77. After assembly, the viscous coupling 31 is received within the housing 25 such that there is relatively little backlash in the connection between the ridges 79 and the grooves 77.

Referring now primarily to FIGS. 2 and 5, each of the outer friction discs 65 defines a plurality of "ears" or tabs 81, each of which has approximately the same configuration as the ridges 79, in view of the fact that each of the ears 81 is received within the same grooves 77 as are each of the ridges 79, although at a different axial location therein It will be understood by those skilled in the art that, within the scope of the invention, the grooves 77 could be "discontinuous", i.e., there could be forward grooves surrounding the viscous coupling 31, and rearward grooves surrounding the clutch pack 33, with no grooves between those locations. However, in the preferred embodiment of the invention, each groove 77 extends far enough axially to receive both the input coupling member 35 and the outer friction discs 65, thus making the manufacture of the housing 25 simpler and less expensive. In the subject embodiment, and by way of example only, there are twelve of the grooves 77, twelve of the ridges 79 and twelve of the ears 81 on each outer friction disc 65.

Referring now primarily to FIGS. 2 and 3, the housing 25 includes a rollover 83 which is included to retain the viscous coupling 29 within the housing 25. As used herein, the term "rollover" will be understood to mean and include the shape shown in FIG. 2 for the portion 83, whether it is made before assembly as part of the process of forming the housing, or is formed as a true rollover during the assembly process. Although the housing 25 could, within the scope of the present invention, be fabricated in any one of several ways, in the subject embodiment, the housing 25 comprises a deep drawn cup-shaped member, with the rollover 83 being at the "bottom" of the cup, and the material which will eventually comprise the rollover 76 being at the upper "lip" of the cup. As part of the deep draw process, or in a separate step, the bottom of the cup radially inward from the rollover 83 is removed, such as by means of a punch operation, as is well known in the art.

As the cup-shaped housing 25 is initially formed, the wall is cylindrical and is at the radius shown in the upper half of FIG. 2. i.e., the wall is at the radius between the grooves 77. Subsequently, an appropriate die set is used (e.g., in a progressive die set-up) to form the grooves 77, by displacing material outwardly at each of the grooves. After the grooves 77 are formed, there is a subsequent operation in which the enlarged portion 73 is formed, such as by a coining operation. As this operation is completed, the enlarged portion 73 comprises a cylindrical wall, with the material which will comprise the rollover 76 being part of the cylindrical wall. Those skilled in the metalworking arts will understand that the wall thickness of the enlarged portion 73 will be slightly less than that of the rest of the housing 25, because of the coining of the portion 73, but the resulting housing will still be considered to have a "generally constant wall thickness" as that term is used hereinafter.

The next step is to assemble the device 17, which first requires measuring the overall axial length of the assembly of the viscous coupling 29, the ball-ramp actuator 31, and the clutch pack 33. This measured overall length is compared to a measured axial dimension within the housing 25, from the inside transverse surface of the rollover 83 to the inside shoulder surface 75. This measured dimension within the housing 25 should always be greater than the assembly overall length, with the difference representing the axial dimension of shims needed between the clutch pack 33 and the endcap 71 to take-up some portion of any clearance within the unit.

In actually assembling the device 17, first the viscous coupling 29 is installed in the housing 25 from the "output" end, i.e., through the enlarged portion 73, with the ridges 79 sliding along the length of the grooves 77 until the viscous coupling is in the position shown in FIG. 2. It is anticipated that the input coupling member 35 will comprise a cast aluminum member, and although certain surfaces of the member 35 may require machining, the outer surface, including the ridges 79, will remain in the as-cast condition. Subsequently, the ball-ramp actuator 31 is inserted to its position shown in FIG. 2, then the subassembly of the clutch pack 33 and the output shaft 19 is put in place as shown. Next, the required shims (not shown herein) are inserted, and then the endcap 71 is put in place against the shoulder surface 75.

With the device basically "assembled", a light biasing force, perhaps in the range of about 20 lbs., is applied axially on the endcap 71, biasing it toward the right in FIG. 2. Finally, the rollover 76 is formed, retaining the endcap 71 against the shoulder surface 75 and, because of the proper selection of the shims, retaining the viscous coupling 29 against the inside surface of the rollover 83. However, it should be noted that in the subject embodiment of the invention, the shims are not selected to provide a tight fit of the various components within the housing, but instead, there is preferably a small gap between the friction discs and the endcap 71, in view of the use of detents on the ramp surfaces 61 and 62. It is believed to be within the ability of those skilled in the art, from a reading and understanding of the foregoing specification, to select the various dimensions and tolerances of the housing 25, the grooves 77, and the ridges 79 and ears 81 to accomplish the objectives of the invention. It is also believed to be within the ability of those skilled in the art to select the proper rollover force for the rollover 76, based upon a knowledge of factors such as the particular material of the housing, the wall thickness of the portion 76, and the separation forces within the device.

Although the invention is illustrated as including a housing 25 and a separate endcap member 71, those skilled in the art will understand that the housing and endcap could be formed as one integral member, in which case the order of assembly would be the clutch pack 33 first, then the ball ramp actuator 31, and finally, the viscous coupling 29. The components would then be retained by forming the rollover 83 over the outer periphery of the coupling member 35.

Operation

In operation, and under normal theoretical driving conditions, the front drive wheels 11 and the rear drive wheels 23 are all rotating at substantially the same speed, and therefore, the input shaft 15 and output shaft 19 are rotating at the same speed. In this theoretical, normal operating condition, the ball ramp actuator 31 remains in its neutral position, as shown in FIG. 3, the input coupling member 35 and output coupling member 43 rotate at the same speed, and the clutch pack 33 is in its "disengaged" condition, as that term was explained previously. In this condition, the entire center differential device 17 rotates substantially as a unit.

If the front drive wheels 11 lose traction, and begin to spin, or otherwise overspeed the rear wheels 23, the input shaft 15 and housing 25 will begin to rotate faster than the output shaft 19. When this occurs, the viscous coupling 29 operates in much the same way as a typical viscous coupling, i.e., with the input rotating faster than the output, a certain amount of torque is transmitted from the input coupling member 35 to the output coupling member 43, by means of viscous shear drag. It is one important aspect of the present invention that the use of the viscous coupling 29 makes the differential device 17 "speed sensitive", i.e., the amount of torque transmitted to the output coupling member 43 is generally proportional to the slip speed, as that term was explained previously, which, in turn, is representative of the amount of slip of the front drive wheels 11. The amount of torque which is transmitted to the output coupling member 43 is then transmitted to the first ramp plate 51.

The use of the viscous coupling 29 to initiate ramping of the ball ramp actuator 31 has an additional benefit. As is well known to those skilled in the viscous clutch art, transmitting torque by viscous shear drag inherently provides a "damping" or "cushioning" effect, such that there will be no harsh or sudden engagement, as the device begins to transfer torque (or begins to transfer substantially more torque) to the rear wheels 23. In other words, the device 17 of the invention provides a much softer engagement than does the typical prior art system.

In accordance with another important aspect of the invention, the ball ramp actuator 31 differs somewhat from many ball ramp actuators known in the prior art. Typically, those used in the prior art are responsive to any relative rotation between the ramp plates, and thus, are in effect "position sensitive". However, in the present invention, because of the biasing force of the springs 69, it takes a certain amount of torque applied to the first ramp plate 51 to achieve a certain amount of relative rotational displacement of the plates 51 and 52, and thus, a corresponding amount of axial movement of the second ramp plate 52, and a corresponding amount of loading of the clutch pack 33. In other words, the greater the amount of slip of the front drive wheels 11, the greater will be the slip speed in the viscous coupling 29, and the greater will be the torque transmitted to the first ramp plate 51, and the greater will be the amount of loading of the clutch pack 33, which in turn, will result in a greater amount of torque being transmitted through the output shaft 19 to the rear drive wheels 23.

An important benefit of the viscous coupling 29 comprising a self-contained unit is that there is a fixed (axially) wall member (i.e., the body or housing 39) adjacent the ball ramp device 31, providing a solid, fixed reaction member against which the ball ramp device exerts a thrust force as the ramp plates 51 and 52 begin to rotate relative to each other. Furthermore, the axially fixed housing 39 makes it possible to provide the rolling type thrust bearing 55 between the housing 39 and the ramp plate 51. The result of this arrangement is an actuator having a very low level of friction, and therefore, very little hysteresis, such that there is a desirable predictability in the actuation of the device which provides for better handling and steering of the vehicle.

Thus, the differential device 17 of the present invention provides a drive line arrangement wherein, under normal driving conditions, substantially all of the driving torque is transmitted to the front drive wheels 11, and little or no (as desired) torque is transmitted to the rear drive wheels 23, but as soon as the front drive wheels 11 begin to slip, drive torque is automatically (with no driver intervention or external controls) transmitted through the output shaft 19 to the rear drive wheels 23, wherein the amount of torque is proportional to the amount of slip of the front drive wheels 11. It should be apparent to those skilled in the art that the device 17 could be designed, within the scope of the present invention, such that even when no substantial slip of the front drive wheels 11 is occurring, some intermediate amount of torque is being transmitted to the rear drive wheels 23. One way of doing this would be simply to apply a predetermine preload or bias to the clutch pack 33, so that there would be a predetermined amount of torque transmission from the input shaft 15 to the output shaft 19, even in the absence of any slip speed within the viscous coupling 29.

The arrangement of the device 17 of the invention permits the full axial travel of the ball ramp device 31, thus permitting the use of smaller ramp angles, which in turn, provides for greater torque multiplication. As a result, even at relatively low slip speeds, it is possible to generate a relatively high torque, which provides a "limp home" capability in the event of failure of the front drive mechanism. Another important result of the relatively high torque capability is the relatively low slip horsepower which is generated, and therefore, the relatively small amount of heat which must be dissipated in order for the device to be durable, and without significant reduction in fuel economy.

From the foregoing description, it should be apparent to those skilled in the art that the relationship between the amount of wheel spin of the front drive wheels 11 (or the slip speed within the viscous coupling 29) is related to the amount of torque transmitted to the output shaft 19, but that such relationship depends upon a number of factors including the viscosity of the fluid in the viscous coupling 29, the clearances between the lands and grooves 45, the ramp angles of the first and second ramp surfaces 61 and 62, the clearances between the adjacent outer friction discs 65 and inner friction discs 67, and the biasing force of the springs 69. It is believed to be within the ability of those skilled in the art to select appropriate values for each of the factors noted above to achieve the desired relationship of torque on the output shaft 19 to slip of the front drive wheels 11.

Furthermore, it is also believed to be within the ability of those skilled in the art to design the friction discs 65 and 67, and to select any appropriate friction material to be applied thereto, in view of the manner of operation of the device 17. For example, if the clutch pack 33 is truly disengaged (transmitting no substantial torque) during normal driving conditions, it may be sufficient to use plain steel discs. On the other hand, if the device 17 is designed such that "disengaged" means that, for example, 30% of full torque will be transmitted to the output shaft 19 during normal driving conditions, then it will be more important to provide a suitable friction material capable of withstanding relatively high temperatures in continuous slipping conditions, such as the pyrolytic carbon friction material mentioned previously.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A differential device of the type including an input shaft adapted to receive input torque from a source of torque, an output shaft adapted to provide driving torque to an output device, and a clutch pack including at least a first friction disc fixed to rotate with said input shaft, and at least a second friction disc fixed to rotate with said output shaft, means operable to move said friction discs between a disengaged position and an engaged position comprising a cam ramp actuator including first and second ramp plates, and a plurality of cam members, each operably disposed between said first and second ramp plates, and in engagement with first and second ramp surfaces, respectively, said second ramp plate being disposed axially adjacent said friction discs and being operable to move said friction discs toward said engaged position, said means operable to move said friction discs further comprising a viscous coupling including an input coupling member fixed to rotate with said input shaft, and an output coupling member; characterized by:

(a) said device comprising a housing member defining, on its inside surface, at least one axially extending groove, extending at least a major portion of the axial extent of said housing;
   (b) said first friction disc including a retention portion extending radially therefrom and being disposed within said axially extending groove, and said input coupling member of said viscous coupling including a retention portion extending radially therefrom and being disposed within said axially extending groove;
   (c) said housing member defining a shoulder surface extending radially outward adjacent said friction discs and said housing member further including an endcap portion disposed axially adjacent said friction discs and in engagement with said shoulder surface, said housing member and said endcap portion including means providing relative axial retention therebetween;
   (d) said housing member and said input coupling member including means providing relative axial retention therebetween.

2. A differential device as claimed in claim 1, characterized by said housing member comprising a unitary, stamped member having generally constant wall thickness.

3. A differential device as claimed in claim 1, characterized by said housing member defining a plurality N of axially extending grooves, said first friction disc defining a plurality N of said retention portions, and said input coupling member defining a plurality N of said retention portions, each of said retention portions being disposed within one of said axially extending grooves.

4. A differential device as claimed in claim 1, characterized by said endcap portion comprising a separate endcap member, and means providing relative axial retention between said housing member and said endcap portion comprising said housing member defining a first rollover, operable to retain said endcap member axially against said shoulder surface.

5. A differential device as claimed in claim 1, characterized by said means providing relative axial retention between said housing member and said input coupling member comprising said housing member defining a second rollover operable to retain said viscous coupling axially against said cam ramp actuator.

* * * * *